Sept. 6, 1932.   H. D. RANDALL   1,876,166
METHOD OF FABRICATING A RUNWAY
Filed Aug. 12, 1930
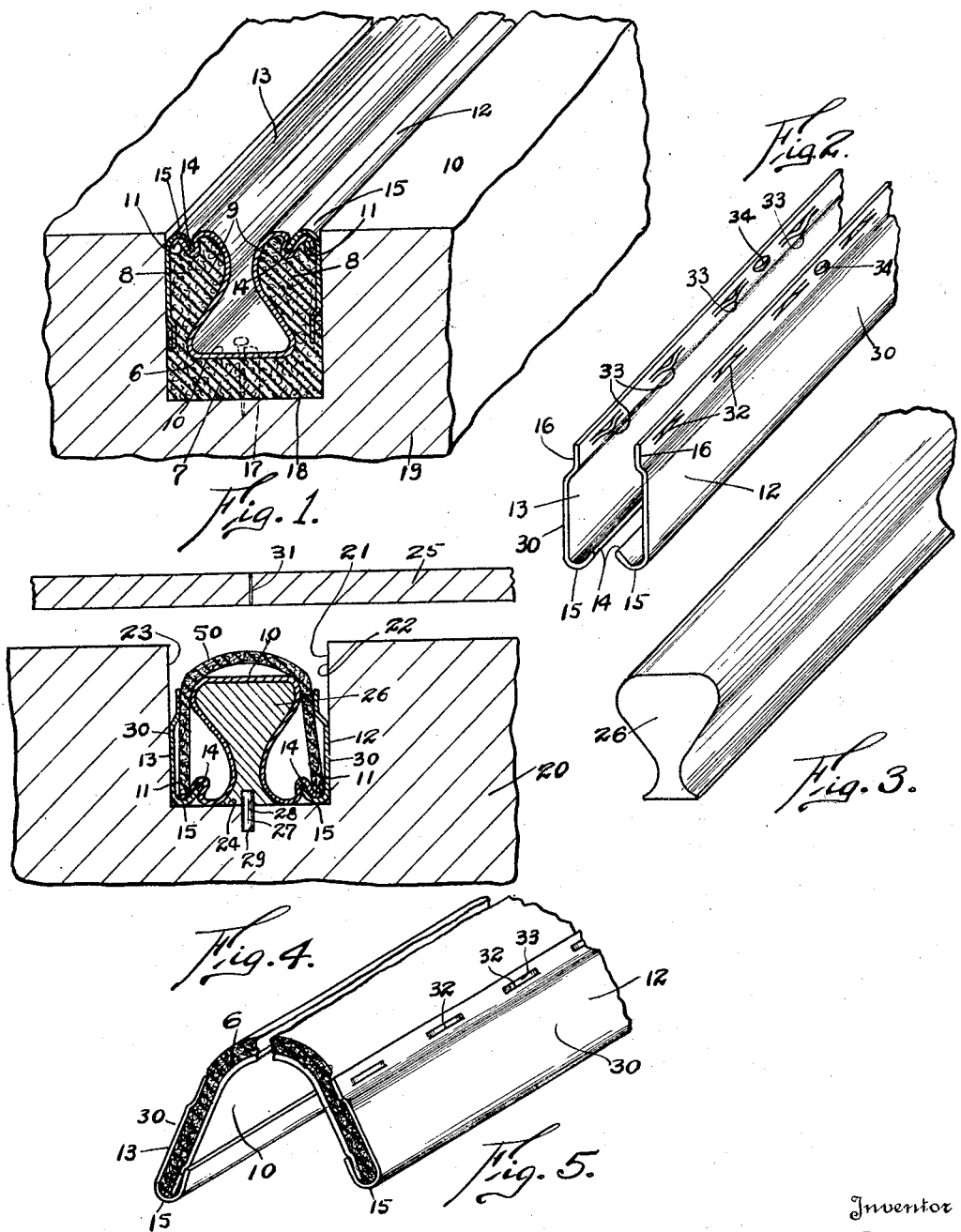

Patented Sept. 6, 1932

1,876,166

UNITED STATES PATENT OFFICE

HOWARD D. RANDALL, OF CINCINNATI, OHIO, ASSIGNOR TO THE RANDALL COMPANY, A CORPORATION OF OHIO

METHOD OF FABRICATING A RUNWAY

Application filed August 12, 1930. Serial No. 474,686.

This invention relates to runways for sliding windows and panels, and a method of manufacturing same.

An object of the invention is to reduce the cost of manufacture of runways of the general character disclosed herein.

Another object is to provide a method for the manufacture of runways, whereby the constituent parts thereof may be securely held and fixed relative to one another.

Another object is to manufacture durable and efficient runway structures by the use of simple and inexpensive means.

These and other objects are attained by the means described herein and disclosed in the accompanying drawing, in which:

Fig. 1 is a cross-sectional perspective view of a runway structure applied to a door or other supporting frame.

Fig. 2 is a perspective view of a pair of anchor or clinch members forming part of the runway structure.

Fig. 3 is a perspective view of a core used in the manufacture of the runway structure.

Fig. 4 is a cross-sectional view of a mold showing the core and the various constituents of the runway disposed therein, which represents a step in the process of manufacture.

Fig. 5 is a perspective view showing how the clinch members may be attached to other constituents of the runway prior to insertion thereof into the mold.

The runway structure disclosed herein comprises a body 6 of sponge rubber or similar material formed to provide a base 7 and sides 8. The sides 8 are provided with inwardly extending lobes 9 which provide a constructed channel in which is received the sliding window pane or panel. A strip 10 of felt or other suitable material covers the lobes and the interior of the body 6, and said strip or cover has its opposite longitudinal edges 11 secured or clinched into the material of the body. For this purpose, the pair of anchor or clinch members 12 and 13 is employed. This general type of runway structure is disclosed in a copending patent application of Howard D. Randall, bearing Serial Number 468,064 filed July 15, 1930.

Each anchor or clinch member has one of its longitudinal edges developed into a bead 15 having an edge 14 adapted to contact the covering 10, and the opposite longitudinal edge thereof, developed into an inwardly turned or offset anchor portion 16 that may be embedded in the material of the body 6, as indicated in Fig. 1. At 17 is represented a nail or other fastening means whereby the runway structure may be fastened within a channel 18 formed in the door or other supporting frame 19. The anchors or clinch members are illustrated in detail in Fig. 2. The method of manufacturing runways of the above type will be described hereinafter, and it will be readily understood that the apparatus disclosed may be altered slightly in order to effect formation of runways not identical with the runway disclosed herein but of the same general character.

In Fig. 4 is represented, at 20, a metallic mold having formed therein a channel 21 having the sides 22 and 23 and a base 24. The size of the channel 21 corresponds substantially with the size of the channel of the support, such as 19, in which the runway structure is to be mounted. A metallic cover 25 is provided for closing the channel of the mold. Before positioning the cover upon the mold, a core such as 26, which may be of any desired shape depending upon the shape to be imparted to the interior of the runway, is placed upon the base 24 of the mold interior. The core may be prevented from shifting in the mold by means of dowel pins 27 received in perforations 28 and 29 formed in the bottom of the core and the base of the mold, respectively. The manner of preventing shifting of the core is immaterial to the invention, wherefore it is to be understood that any other suitable means may be employed for the purpose.

After inserting the core into the mold, the anchor or clinch members 12 are placed therein with their backs 30 in abutment upon the side walls of the mold, the beaded portion 15 thereof being in abutment upon the base of the mold. The strip of felt or other suitable material upon which the pane or panel is to slide, is then placed over the exposed surfaces of the core, with the edges 11 thereof disposed about the clinching edge 14. It should be noted that the extreme edges 11 lie within the bead 15 of the anchor or clinch members.

After positioning the core, the clinch members and the cover 10 with the mold, a quantity 50 of uncured sponge rubber is placed in the mold, after which the lid or plate 25 is positioned upon the mold to close the channel 21 thereof. The filled mold with the cover 25 attached thereto is then subjected to heat sufficient to cause swelling or expansion of the quantity of sponge rubber contained in the mold. During expansion of the uncured sponge rubber, considerable pressure is set up within the mold, thereby forcing the anchor or clinch members, as well as the felt cover, tightly against their supporting surfaces. The sponge rubber also forces itself tightly within the channel formed by the extending portions 15 of the clinch members, thereby effectively securing the edges of the felt covering in position. If necessary, the gases created by heat treating the sponge rubber may be released through one or more vents 31 formed in the mold or cover. If desired, the inner surface of the covering material may have applied thereto a coating of uncured rubber or cementicious substance that will attach itself to the sponge rubber body during the heat treatment.

It is to be noted that the offset portions 16 of the clinch members are provided with openings and cooperative extensions or protuberances 32 and 33, respectively, or they may be provided with simple perforations as indicated at 34 (Fig. 2). The cooperative openings 32 and protuberances 33 may be formed by slitting and punching down portions of the offset members to provide the protuberances or integral straps 33, about which the sponge rubber may form itself during the heat treatment. These straps, being integral and unbroken, securely hold the sponge rubber body and provide a kind of "stitch" or "weave" therewith, which is very effective and durable as a securing means. The invention, however, is not to be limited to the shape and character of protuberance 33 disclosed herein.

In Fig. 5 is shown a modified form of clinch member wherein the bead or clinch portion 15 is clinched upon the untreated sponge rubber body and the covering 10 of felt or other material, prior to insertion into the mold. It should be readily apparent that the assembly shown in Fig. 5 may readily be inserted in the mold as a unit, after which the heat treatment is applied. During the heat treatment, the sponge rubber body expands and secures itself and the covering material 10 tightly within the bead or clinch portion 15. The sponge rubber enters the openings 32, or 34 when provided, and forms about the protuberances or straps 33.

From the foregoing it should be apparent that an efficient and simple method and apparatus has been produced for the manufacture of window runways of the general type disclosed and that the shape of the core used for forming the window receiving channel upon the pane or panel received in the channel of the runway. The shape and size of the clinch or anchor member may also be varied to alter the outward appearance of the completed runway structure. While sponge rubber is considered a desirable material for the manufacture of runways, by the method and means disclosed herein, it is to be understood that other substances capable of expansion within the confines of the mold, may be employed with very effective results.

What is claimed is:

1. The method of fabricating a runway comprising placing in a mold a core having a contour corresponding to a desired form of runway channel, the mold having a base and side walls, placing in the mold against each side wall an anchor member having a clinch portion in abutment upon the base of the mold, covering the core, the base of the mold and each clinch portion with a covering strip for the runway body, placing in the mold upon the covering strip a quantity of material that will expand and retain its expanded condition upon subjection to heat confining the contents of the mold and subjecting the filled mold to a heat treatment for expanding the expansible material whereby to anchor the anchor member and cause the covering material to be pressure held upon the clinch portion of the anchor member, then removing the formed runway from the mold.

2. The method of fabricating a runway comprising placing in a mold a core having a contour corresponding to a desired form of runway channel, the mold having a base and side walls, placing in the mold against each side wall an anchor member having an anchor portion and a beaded clinch portion the bead of the clinch portion lying in abutment upon the base of the mold, placing in the mold a quantity of material that will expand and retain its expanded condition upon subjection to heat, confining the contents of the mold and subjecting the filled mold to a heat treatment for expanding the expansible material whereby to anchor the anchor portion and the beaded clinch portion of the anchor member in the expansible material, then removing the formed runway from the mold.

3. The method of fabricating a runway comprising placing in a mold a core having a contour corresponding to a desired form of runway channel, the mold having a base and side walls, placing in the mold against each side wall a longitudinal strip of metal having a coextensive anchor portion turned toward the interior of the mold and a longitudinal bead having a clinch portion thereon, the bead of said strip lying in abutment upon the base of the mold, covering the core, the base of the mold and each clinch portion with a covering strip for the runway body, placing in the mold upon the covering strip a quantity of material that will expand and retain its expanded condition upon subjection to heat, confining the contents of the mold and subjecting the filled mold to a heat treatment for expanding the expansible material in all directions upon the covering material, longitudinal strip and the mold body, then removing the formed runway from the mold.

In testimony whereof, I have hereunto subscribed my name this 2nd day of August, 1930.

HOWARD D. RANDALL.